United States Patent Office 2,892,845
Patented June 30, 1959

2,892,845

SELECTIVE ETHERIFICATION OF THE 7-HYDROXYL GROUP IN POLYHYDROXY FLAVONOIDS

Leonard Jurd, Los Angeles, Calif., assignor to the United States of America as represented by the Secretary of Agriculture No Drawing. Application November 26, 1957
Serial No. 699,146

4 Claims. (Cl. 260—345.2)

(Granted under Title 35, U.S. Code (1952), sec. 266)

A non-exclusive, irrevocable, royalty-free license in the invention herein described, throughout the world for all purposes of the United States Government, with the power to grant sub-licenses for such purposes, is hereby granted to the Government of the United States of America.

This invention relates to and has as its prime object the provision of novel processes for preparing ethers of polyhydroxy flavonoids, particularly such compounds which are etherified in the 7-position.

A particular object of the invention is the provision of processes for treating polyhydroxy flavonoids to obtain selective etherification at the 7-position while retaining other hydroxyl groups intact. The procedure is demonstrated by the following example provided by way of illustration but not limitation:

*Example 1—Preparation of rhamnetin (7–O–methyl quercetin)*

The starting material for this synthesis was quercetin:

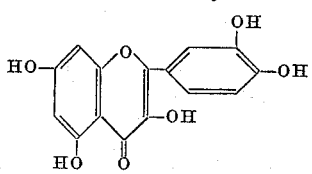

(a) Quercetin was fully acetylated by known procedure to give quercetin-3,3',4',5,7-pentaacetate, otherwise named 3,3',4',5,7-pentaacetyloxy flavone:

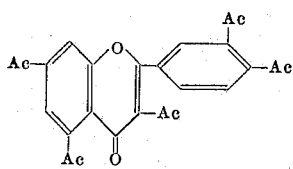

wherein Ac represents the acetoxy radical

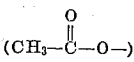

To this end, a mixture of quercetin (5 g.), anhydrous sodium acetate (5 g.), and an excess of acetic anhydride (20 ml.) were heated to boiling for one minute. The solution was cooled then added to an excess of water. The precipitated material was collected, recrystallized from methanol-acetone and then from benzene-hexane. The product, quercetin-3,3',4',5.7-pentaacetate, was obtained as colorless needles having a melting point of 201–202° C.

(b) Quercetin-3,3',4',5.7-pentaacetate (5.0 g.), anhydrous potassium carbonate (13 g.), methyl iodide (10.0 ml.), and dry acetone (75 ml.) were mixed and heated under reflux for 20 hours. The undissolved potassium salts were then filtered off and the filtrate was evaporated to a gum. This was dissolved in warm benzene and filtered from potassium iodide. The benzene filtrate was diluted with hexane and the solution was concentrated until crystallization began. After cooling, the colorless crystalline product (4.2 g.; 89% yield) was collected. It was purified by recrystallization from a mixture of acetone and methanol. Rhamnetin tetraacetate was thereby obtained as colorless needles, M.P. 182–183° C. Its formula is:

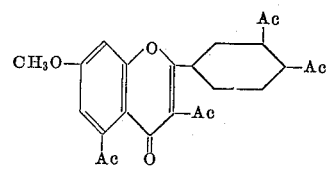

wherein Ac represents the acetoxy radical

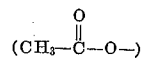

(c) The rhamnetin tetraacetate (3.0 g.) was suspended in warm methanol (15 ml.). The mixture was heated on a steam bath and 10% aqueous sodium hydroxide (3.5 ml.) was added. After 3 minutes water (10 ml.) was added. Heating was continued for a further 5 minutes. Concentrated hydrochloric acid (2.5 ml.) was then added. The yellow solution was digested on the steam bath for 40 minutes during which time a crystalline product separated. This was collected (1.8 g.; 92% yield) and purified by recrystallization from acetone-methanol. Rhamnetin was thus obtained in yellow needles, M.P. 290–292° C. (1.4 g.; 71% yield). Its formula is:

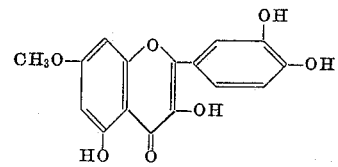

The starting material for the process illustrated above may be any polyhydroxy flavonoid wherein one of the hydroxy groups is at position 7. Illustrative examples of such compounds are:

Flavones:
5,7-dihydroxy flavone; 5,7-dihydroxy-6-methoxy flavone; 5,7-dihydroxy-8-methoxy flavone; 4',5,7-trihydroxy flavone; 5,7-dihydroxy-4'-methoxy flavone; 5,7-dihydroxy-4'-methoxy-3-acetyl flavone; 3',4',5,7-tetrahydroxy flavone; 4',5,7-trihydroxy-3'-methoxy flavone; 4',5,7-trihydroxy-3',5'-dimethoxy flavone; 4',4',5',5,7-pentahydroxy-8-methoxy flavone.

Flavonols (3-hydroxyflavones):
3,5,7-trihydroxy flavone; 5,7-dihydroxy-3-methoxy flavone; 3,4',5,7-tetrahydroxy flavone; 3,5,7-trihydroxy-4'-methoxy flavone; 2',3,5,7-tetrahydroxy flavone; 3,3',4',7-tetrahydroxy flavone; 3,4',5,7-tetrahydroxy-8-methoxy flavone; 3,3',4',5,7-pentahydroxy flavone; 3,4',5,7-tetrahydroxy-3'-methoxy flavone; 3,3',4',5,7-pentahydroxy-8-p-hydroxybenzyl flavone; 2',3,4',5,7-pentahydroxy flavone; 3,3',4',5',7-pentahydroxy flavone; 3,3',4',5,6,7-hexahydroxy flavone; 3,3',4',5,7-pentahydroxy-6-methoxy flavone; 3,3',4',5',5,7-hexahydroxy flavone; 5,7-dihydroxy-3,3',4',6,8-pentamethoxy flavone.

Flavanones:
5,7-dihydroxy flavanone; 5,7-dihydroxy-6,8-dimethyl flavanone; 4',5,7-trihydroxy flavanone; 5,7-dihydroxy-4'-methoxy flavanone; 5,7-dihydroxy-4'-methoxy-6,8-dimethyl flavanone; 3',4',5,7-tetrahydroxy flavanone; 4',5, 7-trihydroxy-3'-methoxy flavanone; 3',4',7-trihydroxy flavanone; 3',4',7-trihydroxy-8-flavanone.

Flavanols (3-hydroxyflavanones):
3,5,7-trihydroxy flavanone; 3,4',5,7-tetrahydroxy flavanone; 3,3',4',7-tetrahydroxy flavanone; 3,3',4',5,7-pentahydroxy flavanone; 3,3',4',5',5,7-hexahydroxy flavanone.

Isoflavones:
4',5,7-trihydroxy isoflavone; 4',5,7-trihydroxy-8-methyl isoflavone; 5,7-dihydroxy-4'-methoxy isoflavone, 2',5,7-trihydroxy isoflavone; 3',4',5,7-tetrahydroxy isoflavone.

Regarding step (a) of Example 1, the aim here is to acylate all the hydroxyl groups in the polyhydroxy flavonoid. Generally acetylation is preferred as being the most convenient technique. However, acetylation is by no means critical and the esterification can be carried out with appropriate reagents to introduce acyl groups derived from formic acid, propionic acid, butyric acid, benzoic acid, paratoluene sulphonic acid, and the like. Methods for acylating all the hydroxyl groups in polyhydroxy flavonoids are known and any of the conventional techniques may be used. One convenient method involves reacting the polyhydroxy compound with an excess of the selected acid anhydride in the presence of an alkali metal salt of the same acid.

Acylation of all the hydroxy group is required to prevent etherification (applied in the next step) of any of the hydroxy groups except that in the 7-position. The hydroxyl group in this position (7) is particularly active and is not protected from etherification by the ester group. The selective effect of etherification is illustrated in Example 1, part (b).

The etherification (illustrated in part (b) of Example 1) may be effectuated with any desired etherification agent. Particularly preferred are the aliphatic, aromatic, or aromatic-aliphatic bromides, iodides, or chlorides. It is obvious that by selection of the etherifying agent any desired ether group can be introduced at position 7. For example the use of methyl iodide or bromide will yield the 7-methoxy derivative, the use of ethyl iodide, bromide or chloride will yield the 7-ethoxy derivative. Illustrative examples of suitable etherifying agents are represented by the formula R—X wherein X represents a halogen atom such as bromine, iodine, or chlorine and R represents an aliphatic, aromatic, or aromatic-aliphatic radical such as methyl, ethyl, propyl, isopropyl, n-butyl, 2-butyl, 2-methyl-propyl, tert. butyl, hexyl, octyl, decyl, dodecyl, 2-ethoxyethyl, 2-phenoxyethyl, 2-benzoxyethyl, benzyl, methyl benzyl, isopropylbenzyl, ethoxybenzyl, phenoxybenzyl, phenyl, tolyl, anisyl, and the like. Instead of the halides, one can use the corresponding sulphates, such as dimethyl sulphate, diethyl sulphate, etc., as the etherifying agent.

The etherifying agent is employed in at least the stoichiometrical amount required to form the monoether. However usually an excess is employed to ensure complete reaction. Use of an excess will not raise any possibility of etherifying at sites other than position 7.

The etherification is conducted under essentially anhydrous conditions and preferably in the presence of sufficient inert solvent to dissolve the organic reactants and hence promote intimate contact therebetween. Suitable solvents are for example benzene, toluene, xylene, dioxane, acetone, furfural, ether, methylethyl ketone, diethyl ketone, di-isopropyl ether, the diethyl ether of ethylene glycol, and so forth. Control of temperature is important to obtain the selective etherification at position 7, that is, the temperature should not be above 60° C. At temperatures substantially above this limit, etherification at sites other than position 7 tends to occur. The reaction is preferably conducted under conditions of reflux and in such case the solvent employed should have a boiling point not higher than 60° C. Suitable solvents for operating under such conditions are, for example, ether and acetone. Refluxing in acetone is preferred as the reflux temperature (56° C.) is high enough to attain a practical rate of selective etherification without danger of etherification at undesired positions.

Also, to promote the etherification an alkaline agent is added to the reaction mixture. Suitable for this purpose are potassium hydroxide, potassium carbonate, sodium carbonate, sodium hydroxide, borax, trisodium phosphate, and the like. In any event the alkaline material should be in essentially anhydrous condition to avoid introducing moisture into the system. The amount of alkaline material should be at least that stoichiometrically required to neutralize the hydrogen halide developed in the etherification and also to neutralize the acyloxy radical released from the 7-position. This will require the equivalent of two moles of OH— per mole of flavonoid. Usually an excess is used to ensure complete reaction.

After performing the selective etherification at position 7 the resulting flavonoid-7-ether containing one or more acyloxy groups is subjected to hydrolysis to convert the acyloxy groups to hydroxyl groups. As illustrated in Example 1, part (c), this can be readily accomplished by contacting the intermediate compound with an aqueous solution containing about 1 to 25% of an alkaline agent, as for example, potassium hydroxide, potassium carbonate, sodium hydroxide, sodium carbonate, trisodium phosphate, borax, ammonium hydroxide, and the like. To promote contact between the acyloxy flavonoid-7-ether and the alkali, a water-miscible solvent such as methanol, ethanol, propanol, isopropyl alcohol, acetone, etc., may be added to the reaction mixture. To expedite the hydrolysis the reaction mixture is heated to about 50–100° C.; usually heating on the steam bath is preferred. The alkaline hydrolysis produces a salt of the hydroxy flavonoid-7-ether and to convert the salt into the free hydroxy or phenol form, the hydrolysis bath is neutralized with an acid such as hydrochloric, sulphuric, phosphoric, acetic or the like.

It is evident from Example 1 taken in connection with the above description that any polyhydroxy flavonoid having a hydroxyl group at position 7 can be converted into a flavonoid-7-ether having one or more free hydroxy groups. These products, which may be termed hydroxy flavonoid-7-ethers, are useful in many areas. For example they are useful for the preparation of azo dyes and wood stains by the procedures disclosed in Patents Nos. 2,723,898 and 2,723,899. Moreover, many of the products exhibit antioxidant properties and hence can be incorporated with various substances normally susceptible to oxidative deterioration whereby to prevent such deleterious effects as rancidification of fatty components, destruction of carotene, vitamins, and vitamin precursors, etc. For such purposes, the products may be incorporated in minor proportion (about 0.01 to 0.1%) in oxidation-susceptible materials, for example, fats and oils such as cottonseed oil, soybean oil, corn oil, peanut oil, lard, etc.; forage crops such as alfalfa, clover, hay; grains such as corn, wheat, oats, rice, barley, rye, soybeans; vegetables such as carrots, peas, spinach, beets, potatoes, sweet potatoes; nut crops such as peanuts, walnuts, almonds; etc. Methods of applying the products to the materials to be preserved may follow conventional techniques, for example, in the case of fats and oils the products may be simply mixed into the material to be preserved; in the case of forage crops and other vegetative materials a solution of the product may be sprayed onto the material to be preserved; in the case of nuts the products mixed with a solution of a suitable binder such as starch, pectin, wax, carboxymethyl cellulose, etc. may be applied as a surface coating.

Among the products of the invention, those which respond to the following formula exhibit especially high antioxidant activity

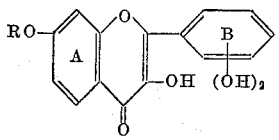

wherein the two hydroxy groups on ring B are in ortho or para relationship to one another, RO— represents the ether group at position 7, and ring A may contain one or more hydroxy substituents.

An especially valuable aspect of the invention is that it makes possible the preparation of products which have greater antioxidant activity than the starting materials. This situation is explained further as follows having reference to the following formula which depicts the basic flavone structure—

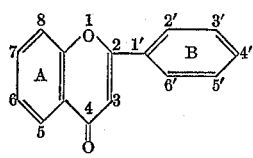

It is known that certain flavonols effectively inhibit the aerobic oxidation of fats and oils. The antioxidant activity of flavonols has been shown to be increased by the presence of a free hydroxyl at position 3 in the pyrone ring and by the presence of two hydroxy groups in ortho or para relationship in the B ring. On the other hand, the presence of meta-hydroxy groupings in the 5,7-position of the A ring exerts the opposite effect of decreasing antioxidant activity. By application of the process of the invention the hydroxyl group at position 7 is etherified whereby the deleterious effect of the meta-dihydroxy grouping is nullified, that is, the antioxidant activity is enhanced. As an example, quercetin may be converted into 7-O-methyl quercetin (also known as rhamnetin) which has been previously disclosed to be much more effective as an antioxidant than quercetin. A particularly practical aspect of this situation is that by the process of the invention quercetin—the only flavonol readily available in commerce—can be converted into a derivative of greatly improved antioxidant activity. Following the principles above described, other polyhydroxy flavonoids containing two hydroxyls in 5,7-positions can be converted into the 5-hydroxy, 7-ether derivatives with resulting enhanced antioxidant activity. Moreover, by etherifying at the 7-position in accordance with the invention the resulting compounds are of greater utility as antioxidants than the starting compounds in that conversion of the 7-OH group to a 7-ether group increases the solubility of the compound in oily subtrates.

The invention is further demonstrated by the following examples—

*Example 2.—Preparation of 7-O-benzyl quercetin*

A mixture of quercetin -3,3',4',5,7-pentaacetate (10.0 g.), benzyl chloride (10 ml.), potassium iodide (1.0 g.), anhydrous potassium carbonate (25 g.) and anhydrous acetone (250 ml.) was heated under reflux for 20 hours. The undissolved potassium salts were filtered off and the filtrate was evaporated to an oil. The oil was washed well with warm hexane (three 50-ml. portions) by shaking and decantation. The hexane-insoluble gummy residue was dissolved in benzene (100 ml.), the potassium chloride and iodide was filtered off, and the hot benzene solution was treated slowly with hot hexane (150 ml.) until crystallization began. After cooling the colorless crystalline product was collected (10.3 g.; 94% yield). It was purified by recrystallization from benzene-hexane and from acetone-methanol. The product, 7-O-benzyl-quercetin-3,3',4',5-tetraacetate, separated from benzene-hexane in colorless needles, M.P. 113–115° C. It separated from methanol-acetone in slightly yellow brittle crystals, M.P. 163° C.

The 7-O-benzyl-quercetin-3,3',4',5-tetraacetate (10.0 g.) was suspended in warm methanol (100 ml.). 10% aqueous sodium hydroxide (36 ml.) was added and the solution was heated on a steam bath for two minutes. Water (100 ml.) was then added and heating was continued for three minutes. Concentrated hydrochloric acid (20 ml.) was added slowly. 7-O-benzyl-quercetin thereby crystallized from the solution. Water (300 ml.) was added and the yellow product was collected and recrystallized from methanol. The 7-O-benzyl-quercetin was obtained in yellow needles, M.P. 245–247° C. (5.4 g.; 77% yield). The product can also be termed 3,5,3',4'-tetrahydroxy-7-benzoxy-flavone.

*Example 3—Preparation of 7-O-benzyl apigenin*

A mixture of apigenin triacetate, otherwise named 4',5,7-triacetyloxy flavone (0.3 g.), benzyl chloride (1.5 ml.), anhydrous potassium carbonate (2.0 g.) and dry acetone (20 ml.) was heated under reflux for 20 hours. The insoluble potassium salts were filtered off and the filtrate was evaporated to a gum. This was washed with hot hexane. The hexane-insoluble material was crystallized from benzene-hexane. The 7-O-benzyl-apigenin-4',5-diacetate separated in colorless needles, M.P. 171–172° C. (0.27 g.).

The 7-O-benzyl-apigenin-4',5-diacetate (0.15 g.) obtained above was suspended in warm methanol (3.0 ml.) and heated on a steam bath. 10% aqueous sodium hydroxide (1.0 ml.) was added. After 1 minute water (5.0 ml.) was added. After heating for a further 2 minutes the solution was acidified with hydrochloric acid. The yellow solid product was collected, washed with water and crystallized from acetone-methanol. 7-O-benzyl-apigenin thereby separated in fluffy yellow needles, M.P. 203–204° C. (0.09 g.; yield 74%). The product may also be termed 4',5-dihydroxy-7-benzoxy flavone.

Having thus described the invention, what is claimed is:

1. A process comprising reacting a flavonoid selected from the group consisting of completely-acylated, polyacyloxy flavones, flavonols, flavanones, flavanols, and isoflavanones, wherein one of the acyloxy groups is on the 7 position of the nucleus and wherein the acyl groups are selected from the class consisting of formyl, acetyl, propionyl, butyryl, benzoyl, and toluenesulphonyl, with an etherifying agent of the class consisting of the chlorides, bromides, iodides, and sulfates of alkyl ($C_1$ to $C_{12}$), 2-ethoxyethyl, 2-phenoxyethyl, 2-benzoxyethyl, benzyl, methylbenzyl, isopropylbenzyl, ethoxybenzyl, and phenoxybenzyl, at a temperature up to 60° C., selectively to replace the acyl group at position 7 with a radical of the class consisting of alkyl ($C_1$ to $C_{12}$), 2-ethoxyethyl, 2-phenoxyethyl, 2-benzoxyethyl, benzyl, methylbenzyl, isopropylbenzyl, ethoxybenzyl, and phenoxybenzyl.

2. The process of claim 1 wherein the flavonoid is 3,3',4',5,7-pentaaectyloxy flavone, the etherifying agent is methyl iodide, and the product is 3,3',4',5-tetraacetyloxy-7-methoxy flavone.

3. The process of claim 1 wherein the flavonoid is 3,3',4',5,7-pentaacetyloxy flavone, the etherifying agent is benzyl chloride, and the product is 3,3',4',5-tetraacetyloxy-7-benzoxy flavone.

4. The process of claim 1 wherein the flavonoid is 4',5,7-triacetoxy flavone, the etherifying agent is benzyl chloride, and the product is 4',5-diacetoxy-7-benzoxy flavone.

References Cited in the file of this patent

Narashimhachari et al.: Chem. Abst., vol. 45, pp. 4714–5 (1951).

Shimizu et al.: Chem. Abst., vol. 46, p. 4004 (1952).